(12) United States Patent
Zhao

(10) Patent No.: US 10,474,415 B2
(45) Date of Patent: Nov. 12, 2019

(54) CONTROL METHOD AND ELECTRONIC DEVICE

(71) Applicants: Beijing Lenovo Software Ltd., Beijing (CN); Lenovo (Beijing) Co., Ltd., Beijing (CN)

(72) Inventor: Xu Zhao, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 511 days.

(21) Appl. No.: 14/861,016

(22) Filed: Sep. 22, 2015

(65) Prior Publication Data

US 2016/0350048 A1 Dec. 1, 2016

(30) Foreign Application Priority Data

May 27, 2015 (CN) .......................... 2015 1 0279807

(51) Int. Cl.
*G06F 3/14* (2006.01)
(52) U.S. Cl.
CPC ..... *G06F 3/1454* (2013.01); *G09G 2330/021* (2013.01); *G09G 2354/00* (2013.01)
(58) Field of Classification Search
CPC ............ G06F 3/1454; G09G 2330/021; G09G 2354/00
See application file for complete search history.

(56) References Cited

U.S. PATENT DOCUMENTS

| 9,495,125 | B2 | 11/2016 | He et al. |
| 9,519,142 | B2 | 12/2016 | He et al. |
| 9,563,262 | B2 | 2/2017 | Lai et al. |
| 9,639,113 | B2 | 5/2017 | Peng |
| 2013/0141331 | A1* | 6/2013 | Shiu ........................ G09G 5/003 345/158 |
| 2013/0235096 | A1 | 9/2013 | Liu |
| 2013/0241944 | A1* | 9/2013 | Lin ........................ G06F 3/1454 345/520 |

(Continued)

FOREIGN PATENT DOCUMENTS

| CN | 103957399 A | 7/2014 |
| CN | 104199631 A | 12/2014 |

(Continued)

OTHER PUBLICATIONS

First German Office Action regarding Application No. 102015218954.6 dated Jan. 13, 2016. English translation from the German Patent and Trademark Office.

(Continued)

*Primary Examiner* — Aneeta Yodichkas
(74) *Attorney, Agent, or Firm* — Harness, Dickey & Pierce, P.L.C.

(57) ABSTRACT

A control method and an electronic device are provided, the control method includes: collecting input data by a collector in a case that a first content is displayed on a first display; determining whether the input data meets a first condition, to obtain a result; and controlling the first display to display an indicating content based on the result, where the indicating content is configured to indicate that a second display is in a first display state to output a second content; where the first display is different from the second display.

15 Claims, 17 Drawing Sheets

(56) References Cited

U.S. PATENT DOCUMENTS

| | | | |
|---|---|---|---|
| 2013/0321711 A1 | 12/2013 | Yang et al. | |
| 2014/0101574 A1* | 4/2014 | Maynard | G06F 3/0484 715/761 |
| 2014/0320912 A1* | 10/2014 | Kubo | G06F 3/1423 358/1.15 |
| 2015/0042633 A1* | 2/2015 | Peng | G06F 3/1423 345/212 |
| 2015/0049000 A1 | 2/2015 | He et al. | |
| 2015/0049066 A1 | 2/2015 | He et al. | |
| 2015/0049120 A1 | 2/2015 | He et al. | |
| 2015/0067366 A1 | 3/2015 | Lai et al. | |
| 2015/0092113 A1 | 4/2015 | Deng | |
| 2015/0331489 A1* | 11/2015 | Edwardson | G06F 3/1423 345/156 |

FOREIGN PATENT DOCUMENTS

| | | |
|---|---|---|
| CN | 104346119 A | 2/2015 |
| CN | 104375272 A | 2/2015 |
| CN | 104423268 A | 3/2015 |

OTHER PUBLICATIONS

First Chinese Office Action regarding Application No. 201510279807.8 dated Jul. 12, 2017. English translation provided by http://globaldossier.uspto.gov.

* cited by examiner

CONTROL METHOD AND ELECTRONIC DEVICE

This application claims priority to Chinese Patent Application No. 201510279807.8, entitled "CONTROL METHOD AND ELECTRONIC DEVICE", filed with the Chinese Patent Office on May 27, 2015, which is incorporated by reference in its entirety herein.

FIELD

The present disclosure relates to the field of display control technology, and particularly to a control method and an electronic device.

BACKGROUND

With the development of electronic technology, a dual-screen device has been widely applied into people's life and work.

A display switch is performed between two screens normally in a process of dual-screen display. For example, the display on B screen is triggered in the case that A screen performs the display operation.

However, a state and result of the display switch between two screens can not be indicated in the conventional technology, and a user is required to determine the result of the display switch between the two screens, therefore resulting in a poor user experience.

SUMMARY

In view of this, a control method and an electronic device are provided according to embodiments of the disclosure, to solve a technical problem in the conventional technology that the state and result of the display switch between two screens can not be indicated, and the user is required to determine the result of the display switch between the two screens, and therefore resulting in a poor user experience.

A control method is provided according to the present disclosure, including:
collecting input data by a collector, in a case that a first content is displayed on a first display;
determining whether the input data meets a first condition, to obtain a result; and
controlling the first display to display a indicating content based on the result, where the indicating content is configured to indicate that a second display is in a first display state to output a second content;
where the first display is different from the second display.

Preferably, before controlling the first display to display the indicating content, the method further includes:
generating a display control instruction base on the input data, where the first display state of the second display is triggered to output the second content in response to the display control instruction.

In the method, preferably, first power consumption of the second display in the first display state is higher than second power consumption of the second display in a second display state, where the second display is in the second display state before the display control instruction is generated.

Preferably, after controlling the first display to display the indicating content, the method further includes:
controlling the first display to switch from a third display state to a fourth display state;
where third power consumption of the first display in the third display state is higher than fourth power consumption of the first display in the fourth display state.

In the method, preferably, the first display has a different imaging method from the second display.

In the method, preferably, a first content is imaged on the first display as a real image with a first size, and the second content is imaged on the second display as a virtual image with a second size;
where the second size is greater than the first size.

In the method, preferably, the indicating content includes direction information, and the direction information matches with a position parameter of the second display with respect to the first display.

In the method, preferably, the controlling the first display to display a indicating content includes:
selecting a target display from multiple second displays;
determining a position parameter of the target display with response to the first display;
generating the indicating content based on the position parameter, where the indicating content includes direction information matching with the position parameter of the target display with respect to the first display; and
controlling the first display to display the indicating content.

An electronic device is provided in the present disclosure, including:
a first display configured to display a first content;
a second display different from the first display;
a collector configured to collect input data; and
a processor configured to determine whether the input data collected by the collector meets a first condition, to obtain a result; and control the first display to display a indicating content based on the result;
where the indicating content is configured to indicate that the second display is in a first display state to output a second content.

In the electronic device, preferably, the collector includes a touch sensor, and the collector is overlapped with the first display in a lighting direction of the first display.

In the electronic device, preferably, the first display is provided at a first position, and the second display is provided at a second position different from the first position, where a first viewing scope of the first display is not overlapped with a second viewing scope of the second display.

In the electronic device, preferably, an imaging displaying structure of the first display is different from an imaging displaying structure of the second display; and
the first display has a different imaging method from the second display.

In the electronic device, preferably, the imaging display structure of the second display includes:
a second display component configured to output initial light;
a light path conversion component configured to receive the initial light from the second display component, perform a light path conversion on the initial light to form a virtual image, and emit the initial light after the light path conversion at a second display area;
where a size of the virtual image is larger than a size of the second display component.

In the electronic device, preferably, the display content of the first display is imaged as a real image, and a size of the real image is smaller than a size of the virtual image.

In the electronic device, preferably, the electronic device further includes:

a body device and a maintaining device;

where the maintaining device has at least one maintaining mode, the maintaining device is at least a portion of annular space or at least a portion of approximate-annular space meeting a first preset condition, and the annular space or the approximate-annular space fixes the body device on a periphery of a column meeting a second preset condition; and where the first display, the second display, the collector and the processor are arranged in the body device and/or the maintaining device.

Based on the solution described above, in the control method and the electronic device according to the embodiments of the present disclosure, the input data when the first display displays the first content is collected by the collector, and whether the input data meets the first condition is further determined to obtain the result, the first display is controlled to display the indicating content based on the result, and the indicating content is configured to indicate that the second display, different from the first display, outputs a second content in the first display state, therefore indicating the user of the current state and result of the display switch of the first display and the second display. Thus, the user can timely know the switch state between the first display and the second display, and the user experience is improved.

BRIEF DESCRIPTION OF THE DRAWINGS

In order to more clearly illustrate the technical solution in the embodiments of the present disclosure or in the conventional technology, in the following, drawings required in the description of the embodiments or the conventional technology will be introduced simply. Obviously, the drawings in the following description are just some embodiments of the disclosure. For those skilled in the art, other drawings can also be obtained according to the provided drawings without any creative work.

DETAILED DESCRIPTION OF EMBODIMENTS

Hereinafter, the technical solution in the embodiments of the present disclosure will be described clearly and completely in conjunction with the drawings in the embodiments of the present disclosure. Obviously, the described embodiments are only a part of the embodiments of the present disclosure, but not all the embodiments. All the other embodiments obtained by those skilled in the art based on the embodiments of the present disclosure without creative work will fall within the scope of protection of the present disclosure.

Figure 1:
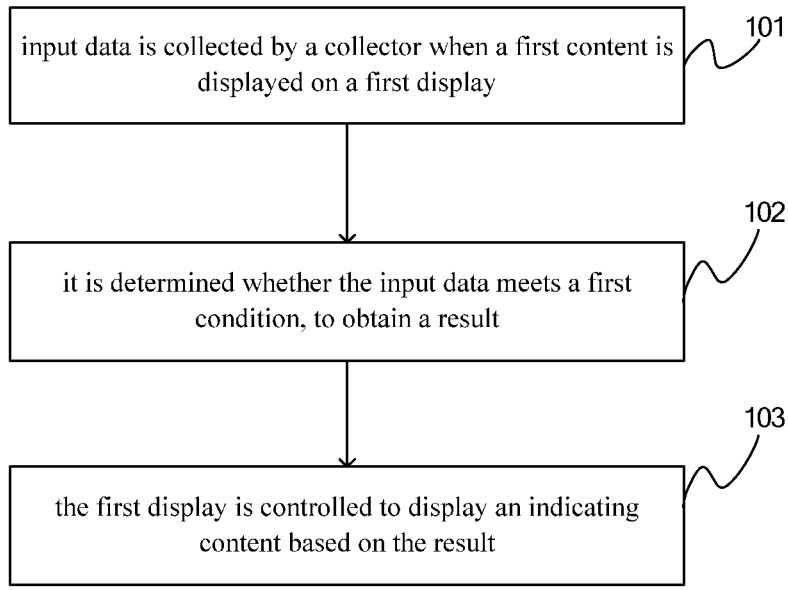
FIG. 1 is a flow diagram of a control method according to a first embodiment of the present disclosure.

Referring to FIG. 1, a flow diagram of a control method according to a first embodiment of the present disclosure is shown, which may be applied to a terminal device with two or more display units, to indicate a user for a state of display switch between these display units. The terminal device may have multiple display units or multiple display screens, such as a phone, a pad, and a wrist watch.

In the embodiment, the method may include step 101 to step 103.

In step 101, input data is collected by a collector when a first content is displayed on a first display.

Specifically, the input data may be a device parameter of the first display, such as a remaining electric power parameter of the first display, an environment parameter of a surrounding environment in which the first display is located such as a light brightness parameter, or data on an input operation of a user of the first display.

Correspondingly, the collector in the embodiment may be a device monitor such as a chip for monitoring a electric power, an environment parameter detector such as a brightness sensor, a sensing device such as an infrared sensor or a touch sensing device, or a hardware input device (including a keyboard or a mouse).

It should be illustrated that the data on the input operation of the user may be data on an operation such as clicking, single-touch point sliding, or double-touch point sliding.

In step 102, it is determined whether the input data meets a first condition, to obtain a result.

Specifically, taking a case that the input data is the data on the input operation as an example, it is determined in the embodiment whether the input operation is an operation for switching a current display unit, to obtain a corresponding result. For example, it is determined in the embodiment whether the input operation is a click operation on a display switch selection area in a first content of the first display, to obtain a result. Whether the display unit is to be switched can be indicated based on the result.

Alternatively, taking a case that the input data is the device parameter of the first display as an example, it is determined in the embodiment whether the device parameter meets a first condition, to obtain a corresponding result. For example, it is determined in the embodiment whether the device parameter indicates that the first display has a remaining electric power less than a preset low electric power protective threshold, to obtain a result. Whether the display unit is to be switched can be indicated based on the result.

In step 103, the first display is controlled to display an indicating content based on the result.

Specifically, the indicating content is used to indicate that a second display is in a first display state to output a second content. The second display is a display unit different from the first display.

In the embodiment, in a case that the result indicates that the input data meets the first condition, for example, the input operation is a display switch operation, the first display is controlled to display the indicating content in the embodiment, to indicate that the second display outputs the second content in the first display state currently. In this way, the user can clearly know that the second display has been in the first display state, and further can directly view the second content on the second display, instead of determining a state and result of current display switch control.

It should be illustrated that, in the embodiment, no operation is performed in a case that the result does not indicate that the input data meets the first condition. That is, no indicating content is displayed on the first display in the case that no display switch is performed. In this case, it is not required to indicate the user for the state and result of the display switch.

In addition, in the embodiment, the first display is controlled to display indicating information in the case that the result does not indicate that the input data meets the first condition. The indicating information is used to indicate that the input data does not meet the first condition, that is, the input data does not meet a condition of performing display switch currently.

In a specific implementation, the first display has a different parameter from the second display. For example, the first display and the second display have different display parameters, different power consumption parameters, different component size parameters or different display effect parameters such as definition parameter and tone. Alternatively, the first display has a different display principle, such as an imaging principle, from the second display. Alternatively, the first display has different current remaining electric power from the second display.

It should be illustrated that, in a specific application of the embodiment, when viewing a content on the display unit, the user can perform an input operation to change a viewing feel, since the first display has different display parameters, different power consumption parameters, different component size parameters, different display principles or different current remaining electric power from the second display as mentioned above. After the display unit is switched, the indicating content is display in response to the input operation, so as to indicate that the second display is in the first display state. Alternatively, a threshold parameter may be preset, the indicating content is displayed after the display unit is switched in a case that a real-time parameter in the input data such as the device parameter or the environment parameter meets the first condition, so as to indicate that the second display is in the first display state.

For example, a size of the first display is smaller than a display size of the second display, and the display unit is switched in response to an input operation in the embodiment when the user wants to view the first content on a large-size screen. Alternatively, a display brightness of the first display is greater than a display brightness of the second display, and the display switch is performed when the user views the first content at night and therefore requires a low-brightness viewing feel. For example, input data such as a light brightness parameter of a current environment collected by the collector is determined in the embodiment, and the indicating content is displayed after the display unit is switched, to indicate that the second display is in the first display state, to meet a requirement of the user to view in a low brightness.

In the control method according to the first embodiment of the present disclosure, the collector collects input data when the first content is displayed on the first display, it is determined whether the input data meets the first condition, to obtain the result, the first display is controlled to display the indicating content based on the result, and the indicating content is configured to indicate that the second display different from the first display outputs the second content in the first display state. Therefore, the user is indicated for the current state and result of the display switch between the first display and the second display, and thus the user can timely know the switch state of the first display and the second display, and user experience is improved.

Figure 2:
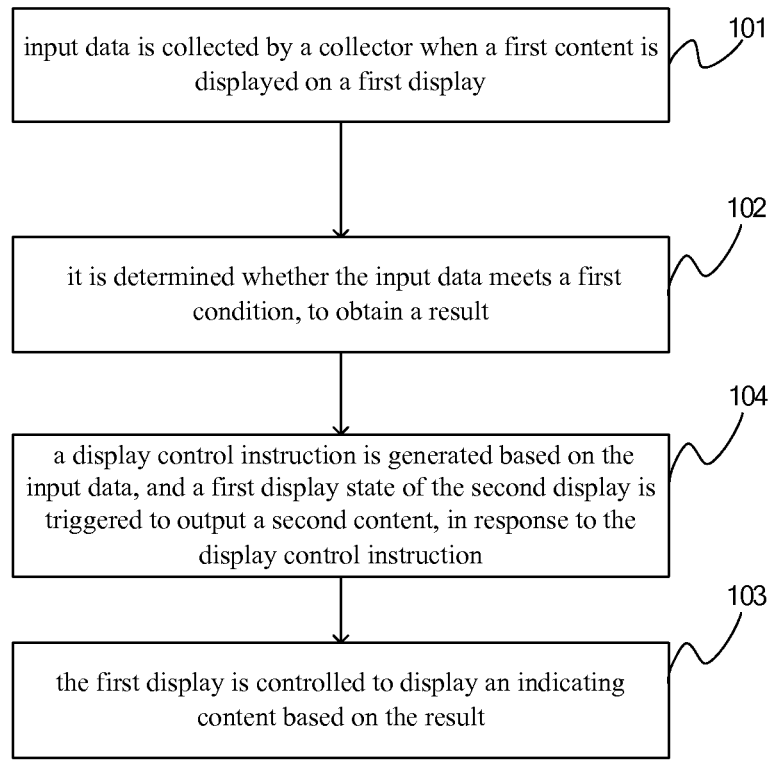
FIG. 2 is a flow diagram of a control method according to a second embodiment of the present disclosure.

Referring to FIG. 2, a flow diagram of a control method according to a second embodiment of the present disclosure is shown. Before the step 103, the method further includes step 104.

In step 104, a display control instruction is generated based on the input data, and a first display state of the second display is triggered to output a second content, in response to the display control instruction.

In the embodiment, the collector collects the input data. It is determined that the collected input data meets the first condition. In this case, a current display state of the second display is triggered to change a current display state of the second display to the first display state by the display control instruction. After or when the second display displays the second content in the first display state, the first display is controlled to display the indicating content to indicate the user for "the second display has been in the first display state, and therefore the second content is displayed". In this way, the user can timely know a state of the switch between the first display and the second display, to improve user experience.

Specifically, the second display in the first display has first power consumption. Before switching to the first display, the display control instruction is not generated and the second display is in a second display state. The second display in the second display state has second power consumption. The first power consumption is different from the second power consumption. In the embodiment, the first power consumption is higher than the second power consumption. That is, the second display is switched from the second display with the lower power consumption to the first display state with the higher power consumption, in response to the display control instruction, to display the second content.

For example, the second display state of the second display is an off state, such as a blank-screen standby state; and the first display state of the second display is an on state, such as a screen-lighting operating state, in which the second content is displayed. In this case, the first power consumption of the second display in the on state is higher than the second power consumption of the second display in the off state. Alternatively, the second display state of the second display is the on state. For example, the second display displays a first display content in the second display state, where the first display content may be a blank content or a preset image content. The first display state of the second display may also be in the on state. In this case, the second display displays a second display content, where the second display content may be a content to be viewed by the user such as a video. In this case, the first power consumption of the second display displaying the second display content is higher than second power consumption of the second display displaying the first display content. That is, the first power consumption of the second display in the first display state is higher than the second power consumption of the second display in the second display state.

Figure 3:
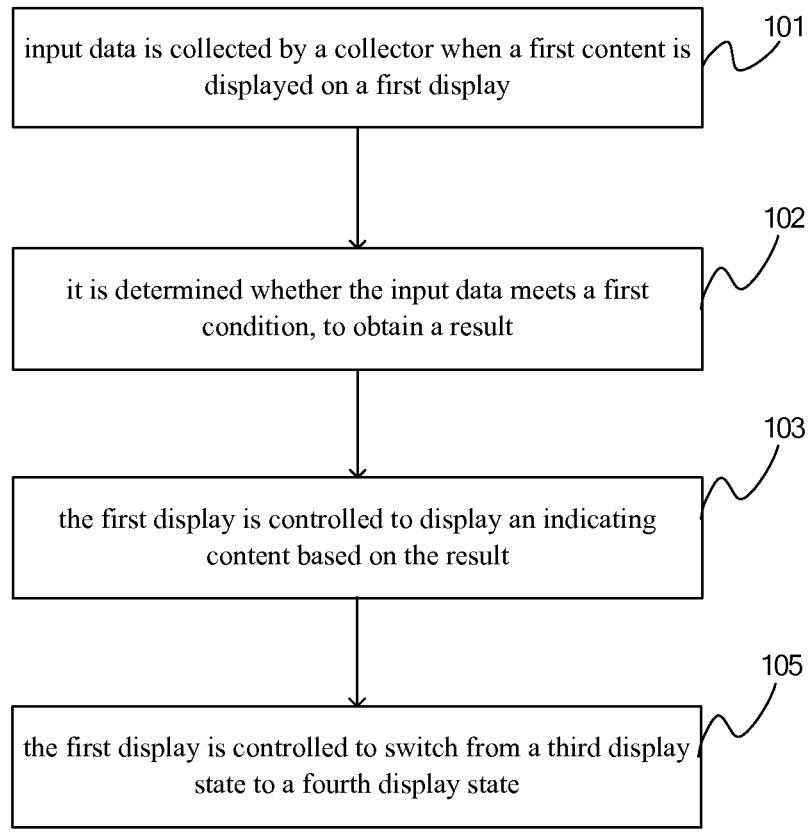
FIG. 3 is a flow diagram of a control method according to a third embodiment of the present disclosure.

Referring to FIG. 3, a schematic flow diagram of a control method according to a third embodiment of the present disclosure is shown. After step 103, the method further includes step 105.

In step 105, the first display is controlled to switch from a third display state to a fourth display state.

Specifically, the third display state is different from the fourth display state. That is, in the embodiment, after the first display is controlled to display the indicating content to indicate that the second display displays the second content in the first display state, the first display is controlled to change a current display state, to realize a corresponding object.

Specifically, in the embodiment, a display effect of the first display in the third display state is different from a display effect of the first display in the fourth display state.

For example, the first display displays an animated graphic in the third display state, and displays a still picture in the fourth display state.

For example, the first display in the third display state has third power consumption, and the first display in the fourth display state has fourth power consumption. The third power consumption may be higher than the fourth power consumption. For example, in the third display state, the first display is in a screen-lighting operation state; and in the fourth display state, the first display is in a blank-screen standby state. Obviously, the third power consumption in the operation state is higher than the fourth power consumption in the standby state (in the blank screen state). That is, in the embodiment, after the first display is controlled to display the indicating content to indicate that the second display is in the first display state, the first display is controlled to switch from the operation state to the blank-screen standby state, to save power consumption.

In the specific implementation, the first display has a different imaging method from the second display.

Specifically, the first content of the first display is imaged as a real image, and the second content of the second display is imaged as a virtual image. In addition, the real image is displayed in a first size, and the virtual image is displayed in a second size, where the second size may be greater than the first size in a practical application. For example, in a projection application of a terminal such as a phone or a pad, the first content is imaged as a real image with a first size on a tangible display screen of the terminal such as a liquid crystal touch display screen, the first content is imaged as a virtual image with a second size on a projection screen of the terminal, where the second size is larger than the first size. In this way, the user can view an image with a larger size on the display screen of the terminal, to satisfy user's view experience.

In a specific application, the indicating content displayed on the first display includes an indicating identifier. The indicating identifier can indicate a direction of the second display with respect to the first display. Specifically, the direction may be a preset direction parameter, for example, the first display and the second display are disposed back to back in a terminal device, or the second display and the first display are disposed adjacently in a terminal device.

Figure 4A:
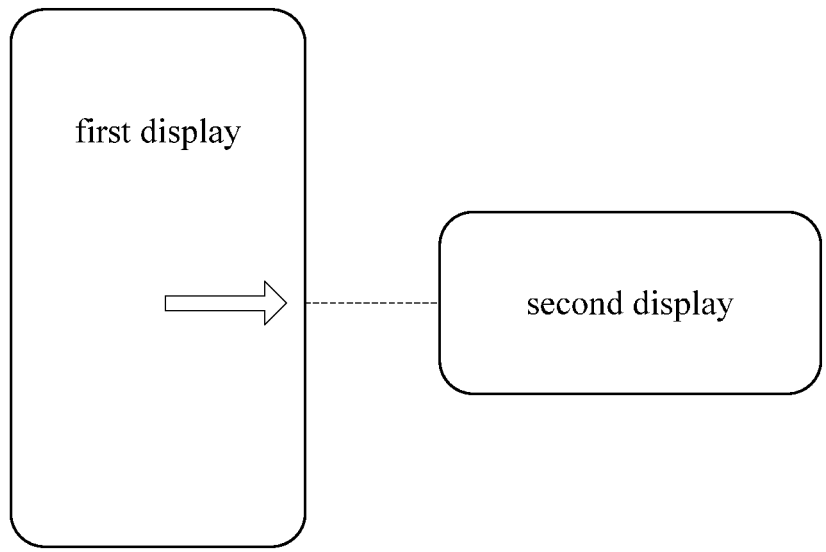
FIG. 4a, FIG. 4b, FIG. 5a, FIG. 5b and FIG. 5c are diagrams of application examples according to the embodiments of the present disclosure, respectively.
Figure 4B:
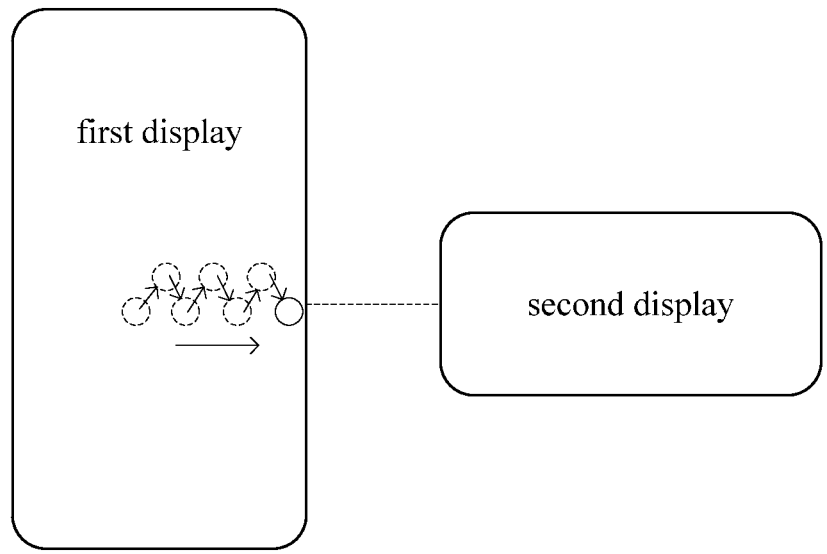

Specifically, the indicating identifier is an icon for indicating a direction, such as a right arrow. Alternatively, the indicating identifier is an identifier which can be operated by the first display, that is, the indicating content is a multi-frame animated graphic. In this case, the direction of the second display with respect to the first display is an identifier operation direction of the indicating identifier. In the embodiment, the indicating content displayed on the first display includes direction information indicating the direction of the second display with respect to the first display. The direction information matches with a position parameter of the second display with respect to the first display. Specifically, the indicating content may be single-frame image information, for example, image information of direction arrow. As shown in FIG. 4a, in a single-frame image of a right directional arrow, the directional arrow is the indicating identifier. Alternatively, the indicating content may also be multi-frame image information, that is, video animation information. As shown in FIG. 4b, in a ball bouncing in a right direction, the ball is the indicating identifier, and the bouncing direction of the ball, i.e. the right direction, is the direction of the second display with respect to the first display.

Figure 5A:
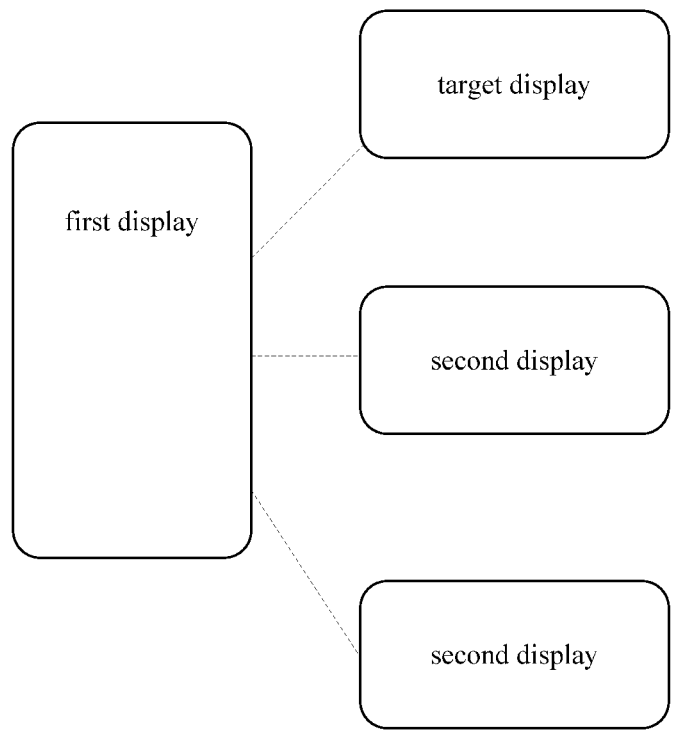

In addition, in the embodiment, there may be a scheme for performing a display switch between one of multiple second displays and the first display. As shown in FIG. 5a, a data control connection exists between each of three second displays and the first display. The technical solution of the embodiment can be applied to a state indicating application for performing the display switch between any one of second display and the first display, or between multiple second displays and the first display.

Figure 6:
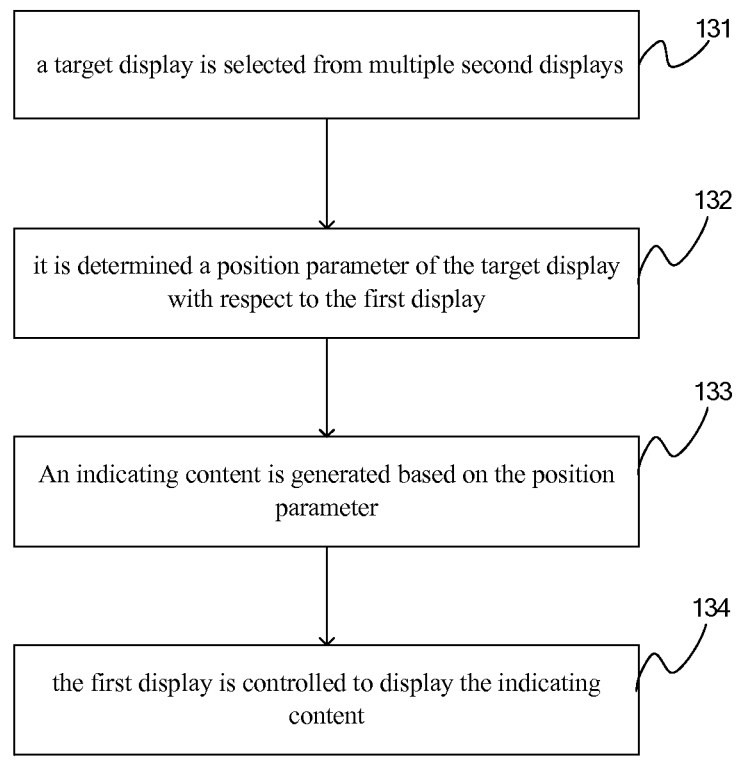
FIG. 6 is a partial flow diagram of a control method according to a fourth embodiment of the present disclosure.

In this case, referring to FIG. 6, a flow diagram of realizing step 103 in a control method according to a fourth embodiment of the present disclosure is shown. The step 103 may includes step 131 to step 134.

In step 131, a target display is selected from multiple second displays.

Specifically, the target display corresponds to the input data, such as a real-time input operation of the user or a preset parameter. That is, the target display is a display unit to be activated by the user to perform display according to the requirement, or a display unit preset by the user to be activated to perform display in a case that the input data meets the first condition.

In the embodiment, one target display is selected. Similarly, multiple target displays may be selected, to be viewed by one or more users simultaneously.

In step 132, it is determined a position parameter of the target display with respect to the first display.

Specifically, the position parameter may be determined by a sensor, for example, the position parameter may be a preset position parameter. For example, the first display and the second display are disposed back to back in a terminal device, or the second display and the first display are disposed adjacently in a terminal device.

In step 133, an indicating content is generated based on the position parameter, where the indicating content includes direction information matching with the position parameter of the target display with respect to the first display.

Specifically, the direction information may be understood as a direction of the second display with respect to the first display based on a user position. For example, for a viewing position of the user, the second display is located at a left or right direction of the first display.

In step 134, the first display is controlled to display the indicating content.

Figure 5B:
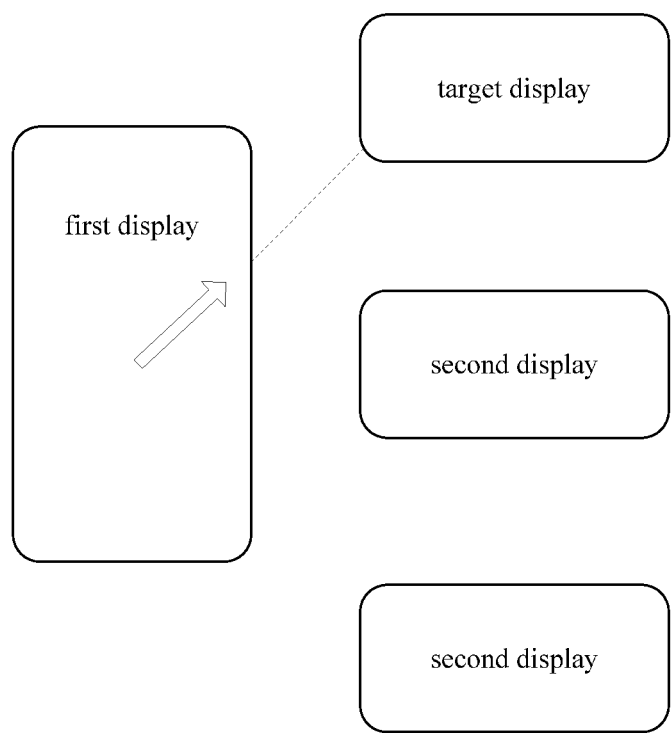

In the embodiment, the indicating content is displayed on the first display, to indicate the user for a direction of the target display with respect to the first display. Therefore, the user can directly find the target display in the direction, as shown in FIG. 5b.

Figure 5C:
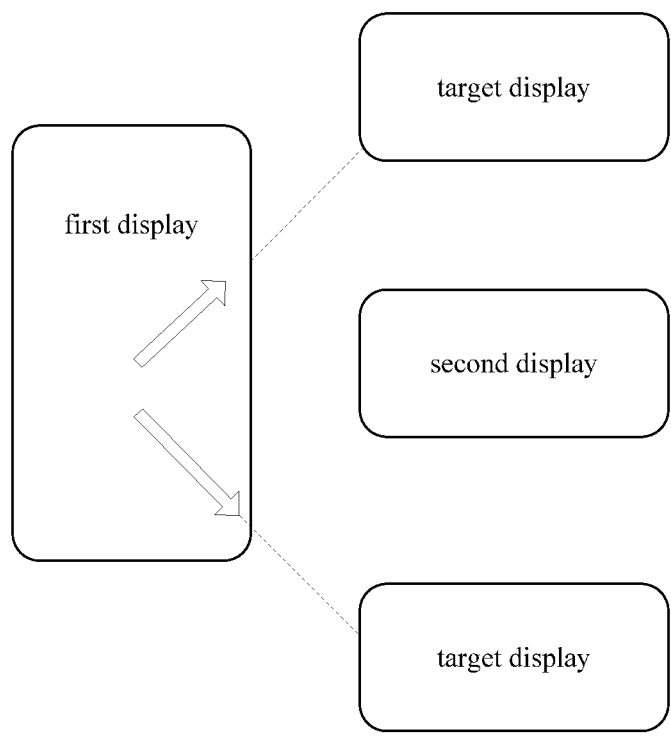

Similarly, in the case of multiple target displays, the indicating content includes direction information matching with a position parameter of each target display with respect to the first display, to indicate the user for a direction of each target display with respect to the first display. In this way, one or more users can find the target display which is to be saw by the user, as shown in FIG. 5c.

Figure 7:
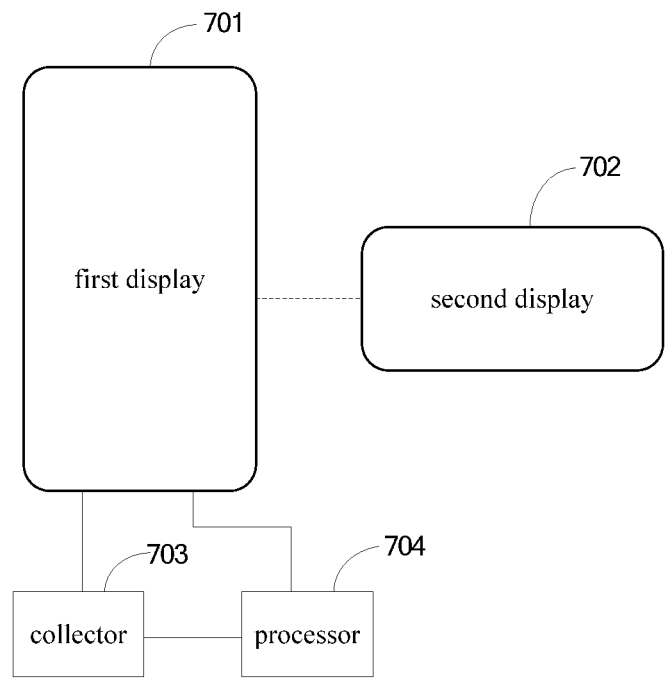
FIG. 7 is a schematic structural diagram of an electronic device according to a fifth embodiment of the present disclosure.

Referring to FIG. 7, a schematic structural diagram of an electronic device is shown according to a fifth embodiment of the present disclosure, which may include a first display 701, a second display 702, a collector 703 and a processor 704.

The first display 701 is configured to display a first content.

The second display 702 is different from the first display.

The collector 703 is configured to collect input data.

Specifically, the input data may be a device parameter of the first display 701, such as a remaining electric power parameter of the first display 701, an environment parameter of a surrounding environment in which the first display 701 is located such as a light brightness parameter, or data about a user input operation of the first display 701.

Correspondingly, the collector 703 in the embodiment may be a device monitor such as a chip for monitoring electric power, an environment parameter detector such as a brightness sensor, a sensing device such as an infrared sensor or a touch sensing device, or a hardware input device (including a keyboard or a mouse)

It should be illustrated that the data on the input operation of the user may be data on an operation such as clicking, single-touch point sliding or double-touch point sliding.

The processor 704 is configured to determine whether the input data collected by the collector 703 meets a first condition, to obtain a result; and control the first display 701 to display an indicating content based on the result.

Specifically, taking a case that the input data is the data on the input operation as an example, it is determined in the embodiment whether the input operation is an operation for switching a current display unit, to obtain a corresponding result. For example, it is determined in the embodiment whether the input operation is a click operation on a display switch selection area in a first content of the first display 701, to obtain a result. Whether the display unit is to be switched can be indicated based on the result.

Alternatively, taking a case that the input data is the device parameter of the first display 701 as an example, it is determined in the embodiment whether the device parameter meets a first condition, to obtain a corresponding result. For example, it is determined in the embodiment whether the device parameter indicates that the first display 701 has a remaining electric power less than a preset low electric power protective threshold, to obtain a result. Whether the display unit is to be switched can be indicated based on the result.

Specifically, the indicating content is configured to indicate that a second display 702 is in a first display state in which the second display 702 outputs a second content.

In the embodiment, in a case that the result indicates that the input data meets the first condition, for example, the input operation is a display switch operation, the first display 701 is controlled to display the indicating content in the embodiment, to indicate that the second display 702 outputs the second content in the first display state currently. In this way, the user can clearly know that the second display 702 has been in the first display state, and further can directly view the second content on the second display 702, instead of determining a state and result of current display switch control.

It should be illustrated that, in the embodiment, no operation is performed in a case that the result does not indicate that the input data meets the first condition. That is, no indicating content is displayed on the first display 701 in the case that no display switch is performed. In this case, it is not required to indicate the user for the state and result of the display switch.

In addition, in the embodiment, the first display 701 is controlled to display indicating information in the case that the result does not indicate that the input data meets the first condition. The indicating information is used to indicate that the input data does not meet the first condition, that is, the input data does not meet a condition of performing display switch currently.

In a specific implementation, the first display 701 has a different parameter from the second display 702. For example, the first display 701 and the second display 702 have different display parameters, different power consumption parameters, different component size parameters or different display effect parameters such as definition parameter and tone. Alternatively, the first display 701 has a different display principle, such as an imaging principle, from the second display 702. Alternatively, the first display 701 has different current remaining electric power from the second display 702.

It should be illustrated that, in a specific application of the embodiment, when viewing a content on the display unit, the user can perform an input operation to change a viewing feel, since the first display 701 has different display parameters, different power consumption parameters, different component size parameters, different display principles or different current remaining electric power from the second display 702 as mentioned above. After the display unit is switched, the indicating content is display in response to the input operation, so as to indicate that the second display 702 is in the first display state. Alternatively, a threshold parameter may be preset, the indicating content is displayed after the display unit is switched in a case that a real-time parameter in the input data such as the device parameter or the environment parameter meets the first condition, so as to indicate that the second display 702 is in the first display state.

For example, a size of the first display 701 is smaller than a display size of the second display 702, and the display unit is switched in response to an input operation in the embodiment when the user wants to view the first content on a large-size screen. Alternatively, a display brightness of the first display 701 is greater than a display brightness of the second display 702, and the display switch is performed when the user views the first content at night and therefore requires a low-brightness viewing feel. For example, input data such as a light brightness parameter of a current environment collected by the collector is determined in the embodiment, and the indicating content is displayed after the display unit is switched, to indicate that the second display 702 is in the first display state, to meet a requirement of the user to view in a low brightness.

In the electronic device according to the fifth embodiment of the present disclosure, the collector collects input data when the first content is displayed on the first display, it is determined whether the input data meets the first condition, to obtain the result, the first display is controlled to display the indicating content based on the result, and the indicating content is configured to indicate that the second display different from the first display outputs the second content in the first display state. Therefore, the user is indicated for the current state and result of the display switch between the first display and the second display, and thus the user can timely know the switch state of the first display and the second display, and user experience is improved.

Figure 8:
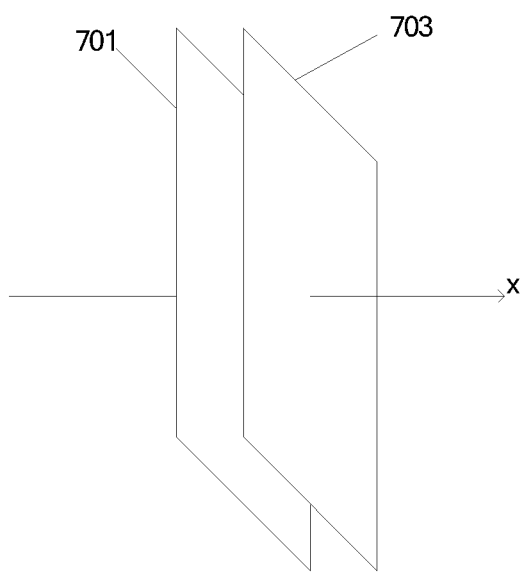
FIG. 8 is a diagram of another application example according to the embodiments of the present disclosure.

In an implementation, the input data may be collected by the collector 703, which is an operation data input by a user and displayed on the first display 701. The collector 703 may be a touch sensor. In this case, the collector 703 is overlapped with the first display 701 in a lighting direction x of the first display 701, as shown in FIG. 8. The collector 703 is overlapped with the first display 701 in the lighting direction of the first display 701, to form a touch display or a touch screen.

Figure 9A:
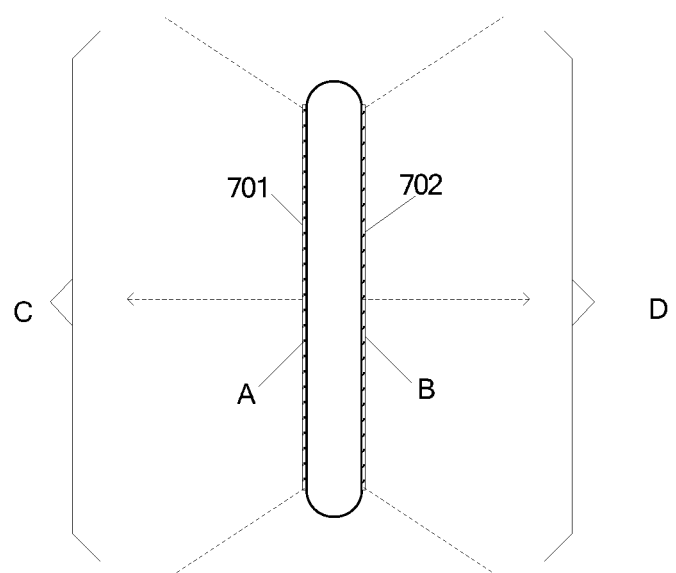
FIG. 9a, FIG. 9b and FIG. 9c are diagrams of other application examples according to the embodiments of the present disclosure, respectively.

In an actual application, the first display 701 is disposed at a first position, and the second display 702 is disposed at a second position, and the first position is different from the second position. As shown in FIG. 9a, the first display 701 is disposed at A position, and the second display 702 is disposed at B position, A position is not overlapped with B position. Therefore, a first viewing range C for the user viewing the first display 701 is not overlapped with a second viewing range D for the user viewing the second display 702. The non-overlapped viewing range means that the first viewing range and the second viewing range do not superpose completely, i.e., an intersecting range may exist, but a nonintersecting range definitely exists. Therefore, the first display 701 and the second display 702 presents different view effects for the user when being viewed by the user. For example, the second display 702 is located at a shielded position for the user, and thus the user can not view all second content. In this case, the indicating content is displayed on the first display 701, to indicate the user to watch the second display 702.

It should be illustrated that an angle between a border line of the first viewing range C or the second viewing range D and a center vertical line of a display area may range from 75 degree to 105 degree, as shown in FIG. 9a.

For example, the first display 701 is located at a first side of the electronic device such as a phone, and the second display 702 is located at a second side of the electronic device such as a phone, where the first side and the second side are two opposite sides of the electronic device such as a phone, that is, a front side and a back side, as show in FIG. 9a. Therefore, the first viewing range of the first display 701 is not overlapped with the second viewing range of the second display 702. Therefore, the indicating content is displayed on the first display 701 in the embodiment, to indicate the user to turn over the electronic device such as the phone, so as to see the second content displayed on the second display 702, therefore realizing the object of the present disclosure.

In an embodiment, the first display 701 is disposed at E position, and the second display 702 is disposed at F position, E position is not overlapped with F position. Thus, a first viewing range G for the user viewing the first display 701 is not overlapped with a second viewing range H for the user viewing the second display 702. As shown in a side view structure of a waist device in FIG. 9b, E position is adjacent to the F position, and thus the first display 701 is disposed adjacent to the second display 702. A real image with a first size is displayed on the first display, and a virtual image with a second size is displayed on the second display 702. Therefore, the user can perform an input operation when requiring saving electricity or viewing images with display effects having different sizes or imaging effects having different imaging principles, perform the display switch, and turn over the device, to obtain viewing feel of the second display 702 different from the first display 701.

Figure 9B:
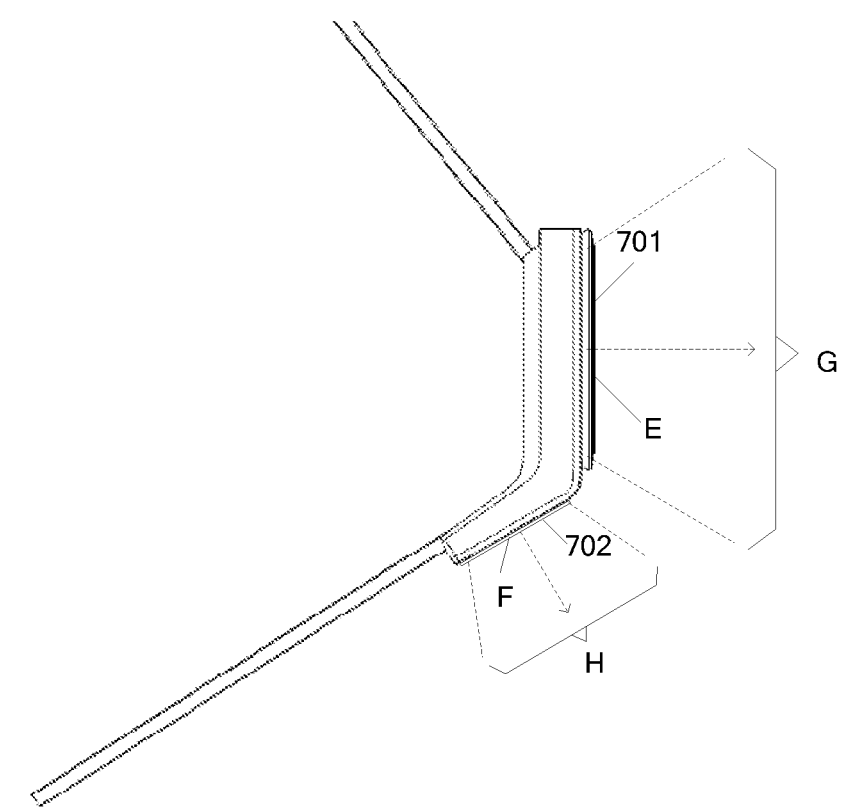

It should be illustrated that, in the structure shown in FIG. 9b, the first display 701 and the second display 702 may be display units having the same display principle and different sizes. For example, the first display 701 and the second display 702 are both a liquid crystal display screen, on which real images are imaged.

In FIG. 9b, an angle between a border line of the first viewing range G or the second viewing range H and a center vertical line of the display unit thereof may range from 75 degree to 105 degree, and the first viewing range G and the second viewing range H does not overlap with each other. Therefore, in the embodiment, the indicating content is displayed on the first display 701, to indicate the user to rotate the wrist device in a certain angel to see the second content on the second display 702.

Figure 9C:
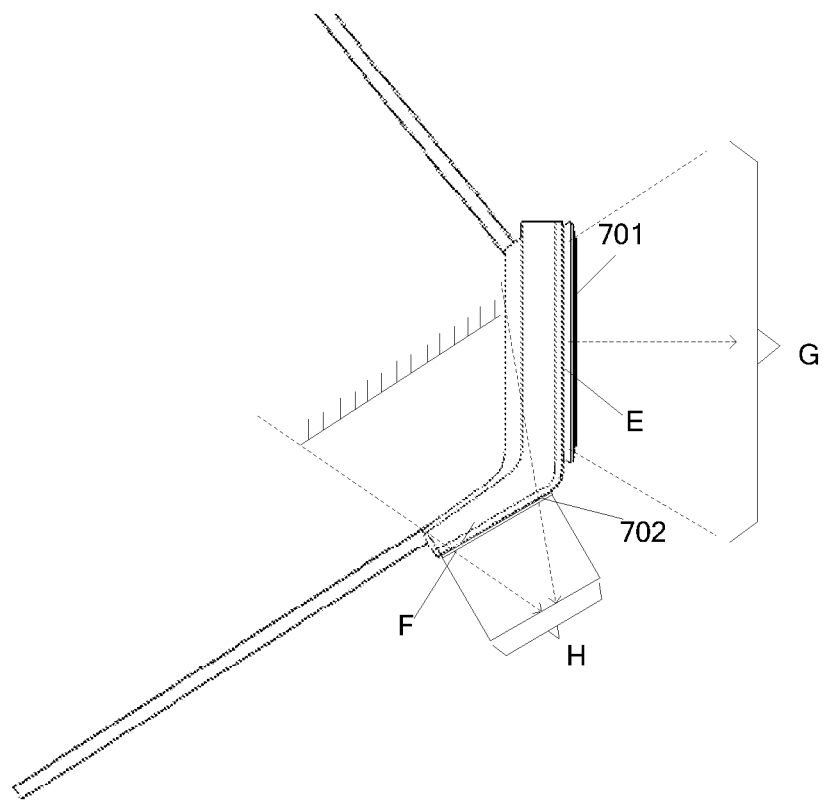

However, in the structure shown in FIG. 9c, the first display 701 and the second display 702 may be display units having different display principles, i.e., different display structures. For example, the first display 701 is a liquid crystal display screen, and the second display 702 is a light path converting display screen. Therefore, a real image is imaged on the first display 701, and an enlarged virtual image is imaged on the second display 702. As shown in FIG. 9c, the user can view the enlarged virtual image formed by the second display 702 in a certain distance from the second display 702. Therefore, a rectangular second viewing range H shown in FIG. 9c is formed, the user can view a complete enlarged virtual image displayed by the second display 702 at any position within the second viewing range H. Specifically, the first viewing range G is not overlapped with the second viewing range H.

In addition, in addition to a viewing angle, a difference of viewing effects for the user viewing the first display 701 and the second display 702 may be the second display 702 having a display size greater than the first display 701, or display definition of the second display 702 having a display definition greater than the first display 701.

It should be illustrated that the first display 701 differs the second display 702 in that an imaging displaying structure corresponding to the first display 701 is different from an imaging displaying structure of the second display 702.

Therefore, correspondingly, the first display 701 has a different imaging method from the second display 702.

For example, a real image is imaged on the first display 701, and a virtual image is imaged on the second display 702.

Figure 10:
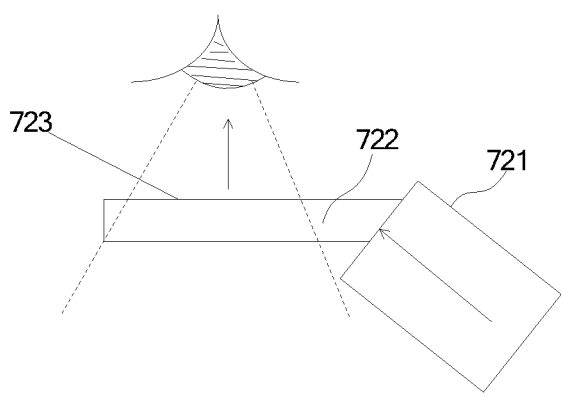
FIG. 10 is a schematic structural diagram of a second display in an electronic device according to a sixth embodiment of the present disclosure.

Specifically, referring to FIG. 10, a schematic structural diagram of a second display 702 of an electronic device according to a sixth embodiment of the present disclosure is shown. The second display 702 may includes a second display component 721 and a light path converting component 722.

The second display component 721 is configured to output an initial light.

The light path conversion component 722 is configured to receive the initial light from the second display component 721, perform a light path conversion on the initial light to obtain a virtual image, and emit the initial light after the light path conversion from a second display area 723.

Specifically, a size of the virtual image is larger than a size of the second display component.

In other word, the second display 702 is a light path conversion display unit, and the second display component 721 outputs the initial light to the light path conversion component 722, the light path conversion is performed on the initial light, to obtain the virtual image, the virtual image is emitted in the second display area 723 of the second display 702, to image the virtual image.

It should be illustrated that a size of the second display area 723, i.e. a size of the virtual image, is greater than a size of the second display component 721, to convert initial light to an enlarged virtual image. Thus, a display effect of a virtual image on the second display 702 is different from a display effect of the real image on the first display 701. That is, the display content of the first display 701 is imaged as the real image, and a size of the real image is smaller than the size of the virtual image.

An electronic device is further provided according to a seventh embodiment of the present disclosure. In the embodiment, the electronic device may further include a body device 705 and a maintaining device 706.

The maintaining device 706 has at least one maintaining mode, the maintaining device 706 is at least a portion of annular space, or at least a portion of an approximate-annular space meeting a first preset condition. The first preset condition may be that a central angle corresponding to the maintaining device 706 is greater than or equal to a preset angle, for example, 300 degrees. The annular space or the approximate-annular space fixes the body device 706 on a periphery of a column meeting a second preset condition.

Specifically, the first display 701, the second display 702, the collector 703 and the processor 704 are disposed in the body device 705 and/or the maintaining device 706.

Figure 11:
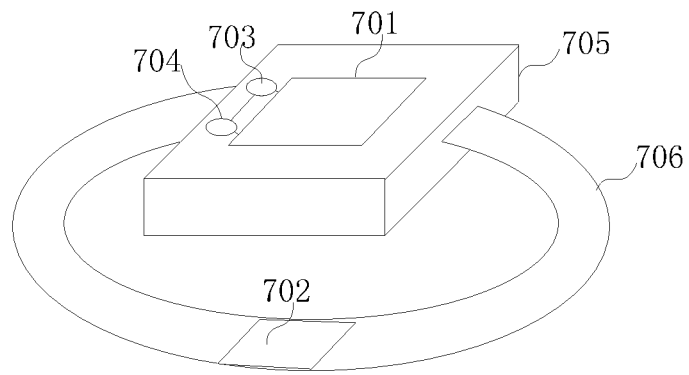
FIG. 11 to FIG. 23 are schematic structural diagrams of an electronic device according to a seventh embodiment of the present disclosure, respectively.
Figure 12:
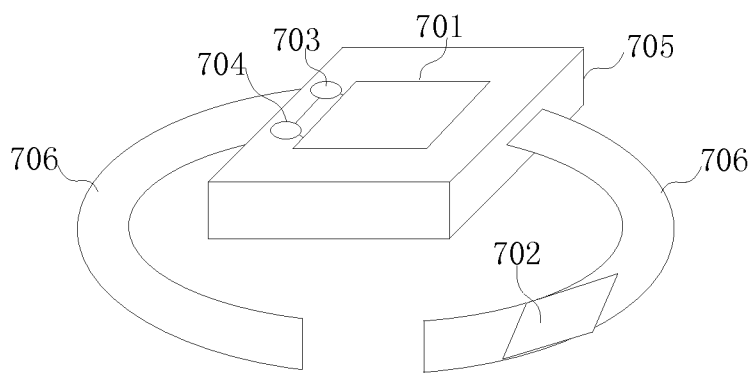

Specifically, FIG. 11 and FIG. 12 show two maintaining mode for connecting the maintaining device 706 with the body device 705, respectively. In a first maintaining mode shown in FIG. 11, the maintaining device 706 and the body device 705 form closed annular space, where the maintaining device 706 and the body device 705 are parts of the annular space. In a second maintaining mode shown in FIG. 12, the maintaining device 706 and the body device 705 form an approximate-annular space having a small opening, where the maintaining device 706 and the body device 705 are parts of the approximate-annular space. For example, the maintaining device 706 is a watch band of a similar watch structure, and the body device 705 is a dial of the similar watch structure. The annular space or the approximate-annular space including the body device 705 and the maintaining device 706 can surround the column such as a wrist of the user. A diameter of the annular space or the approximate-annular space is greater than a diameter of the column such as the wrist and smaller than a diameter of an end position of the column such as a fist of the user.

Figure 13:
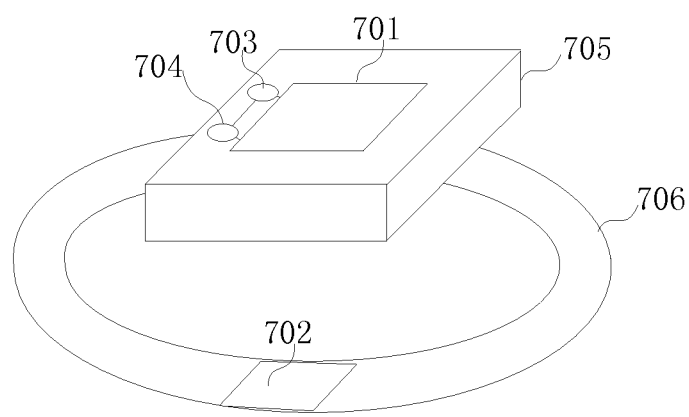
Figure 14:
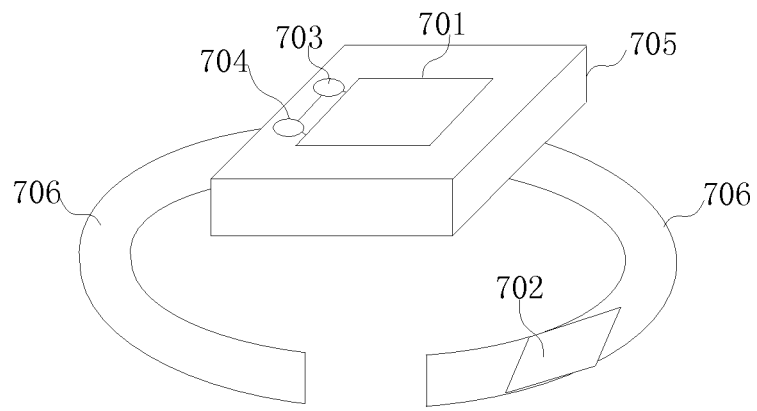

In addition, the annular space or the approximate-annular space can also be formed only by the maintaining device 706. As shown in FIG. 13 and FIG. 14, the body device 705 may be disposed at an upper part of the maintaining device 706, that is, the body device 705 is attached onto the maintaining device 705 in a surface-contact way. In this way, only the maintaining device 706 forms the annular space as shown in FIG. 13 or the approximate-annular space as shown in FIG. 14 which surrounds the column. A fixed structure such as a buckle, a snapper or a zipper is disposed on the maintaining device 706, to fix the annular space or the approximate-annular space formed by the maintaining device 706 on the periphery surrounding the column.

Figure 15:
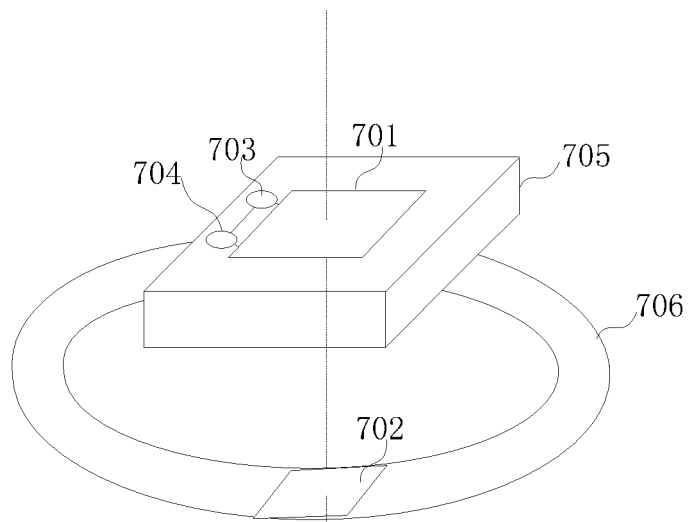

In the embodiment, the electronic device is a wrist electronic device. The electronic device includes two display units, both of which are disposed on the body device 705 or the maintaining device 706; or one of which is disposed on the body device 705, and another of which is disposed on the maintaining device 706. There is a position relation between the first display 701 and the second display on the electronic device. For example, the first display 701 is disposed on the body device 705 of the electronic device, the second display 702 is disposed on the maintaining device 706 of the electronic device, and the first display 701 and the second display 702 are disposed oppositely in the annular structure of the electronic device, as shown in FIG. 15.

It should be illustrated that, in a specific implementation of the embodiment, the second display 702 may be disposed based on actual requirement. For example, the second display 702 is disposed a position of the maintaining device 706 adjacent to the body device 705 or other position. For an actual usage requirement of a wrist electronic device such as a watch, a width and thickness of a position, such as the maintaining device 706, where the second display 702 is located can be adjusted appropriately, to meet the actual usage requirement of the user after the second display 702 is fixed.

Figure 16:
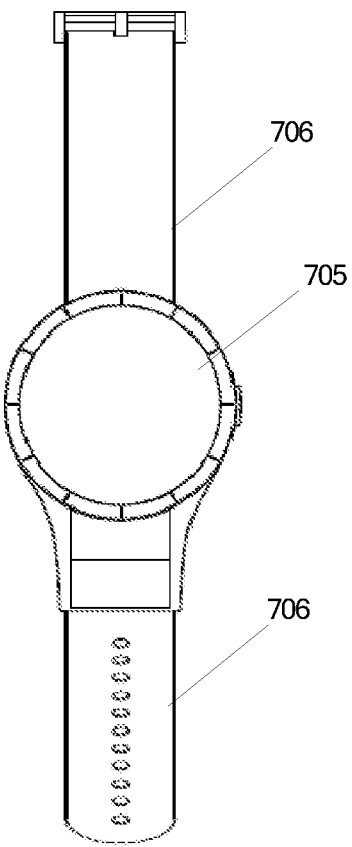
Figure 17:
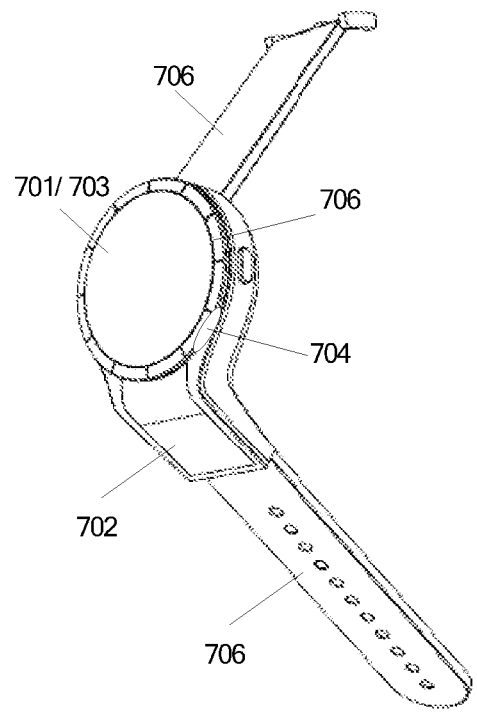

In an actual implementation, as shown in FIG. 16, the electronic device in the embodiment is a wrist device such as a watch structure, which includes a body device 705 such as a dial, and a maintaining device 706 such as a watch band. As shown in FIG. 17, the first display 701 may be disposed on the dial of the body device 705, and the second display 702 may be disposed at a position on the maintaining device 706 such as the watch band adjacent to the dial. The collector 703 is provided on the dial, which is overlapped with the first display 701. The processor 704 may also be disposed on the dial. That is, in the embodiment, the first display 701 and the second display 702 are disposed adjacently, and the first display 701 and the second display 702 are different. Therefore, the user will perform an input operation when requiring the display switch, and turn over the watch after performing the display switch, to view the display content on the second display 702 on the maintaining device 706, and obtain viewing feel of the second display 702 which is different from the first display 701.

Specifically, the second display 702 may have a structure as shown in FIG. 10, and the first display 701 may be a common touch display screen. Therefore, the first display 701 will display a real image, and the second display 702 will display a virtual image. When requiring viewing an image in a different imaging principle, the user will perform the display switch by the input operation; the indicating content is then displayed on the first display 701, to indicate that the second display 702 outputs the virtual image in the first display state; and thus the user can view the virtual image on the second display 702 by turning over the phone.

It should be illustrated that, in the embodiment, the indicating content displayed on the first display 701 may include an indicating identifier. The indicating identifier can indicate a direction of the second display with respect to the first display. Specifically, the direction may be a preset direction parameter.

Specifically, the indicating identifier is an icon for indicating a direction such as a right arrow. Alternatively, the indicating identifier is an identifier which can be operated by the first display, that is, the indicating content is a multi-frame animated graphic. In this case, an identifier operation direction of the indicating identifier is the direction of the second display with respect to the first display. In the embodiment, the indicating content displayed on the first display includes direction information indicating the direction of the second display with respect to the first display. The direction information matches with a position parameter of the second display with respect to the first display.

Figure 18:
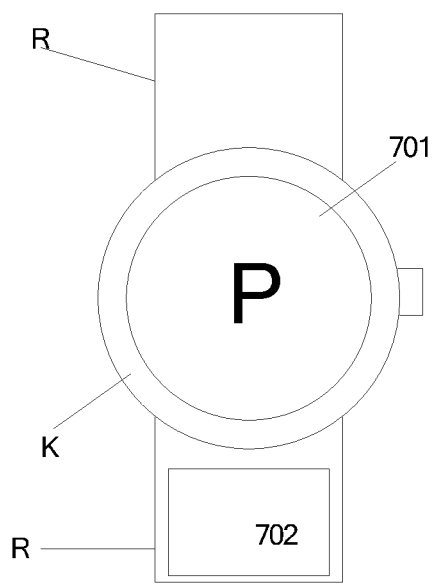
Figure 19:
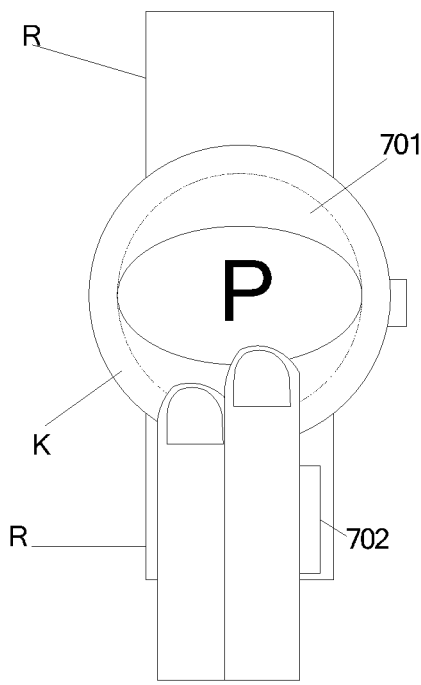
Figure 20:
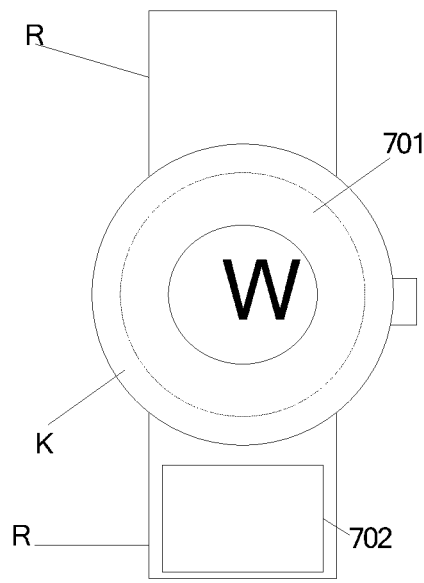
Figure 21:
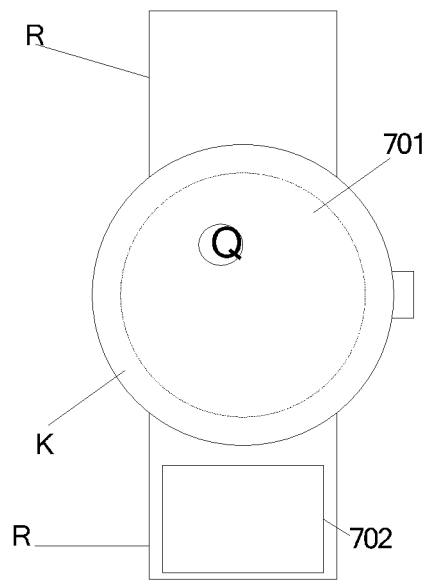
Figure 22:
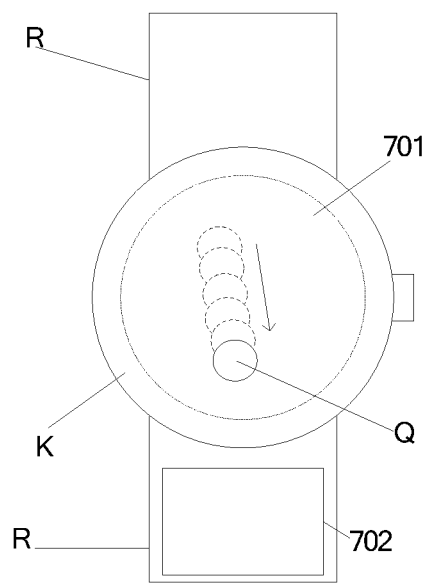
Figure 23:
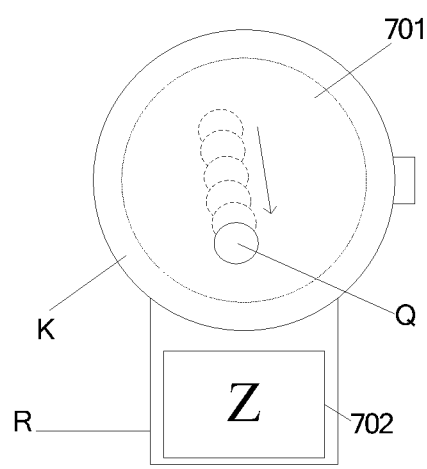

For example, as shown in FIG. 18, a first content P is displayed on the first display 701 of the dial K. The user may perform an input operation for a display switch, such as a two-finger sliding operation as shown in FIG. 19, based on a viewing requirement, so as to change a display of the first content P, such as a shrunken first content as shown in FIG. 19. Then, a colored circular pattern as shown in FIG. 20 is formed, and the circular pattern is changed into a ball pattern Q with a certain diameter slowly as shown in FIG. 21. This ball pattern is the indicating content mentioned above in the embodiment, the indicating identifier in the indicating content includes for example that the ball pattern jumps or flashes downwards as shown in FIG. 22 to arrive at the bottom of the dial, so as to indicate that the second display 702 on the watch band R is in the first display state. The user then see a display content Z on the second display 702 by turning over the watch as shown in FIG. 23.

It should be illustrated that, in the embodiment, the display unit in the electronic device may be switched in response to multiple touch-point operation such as multi-finger (double-finger) sliding or clicking as shown in FIG. 19, or in response to a single touch-point operation such as single-finger sliding or clicking.

Specifically, when the input operation is determined in the embodiment, the first condition may be a single touch-point sliding operation or multiple touch-point sliding operation in a direction of the second display 702 with respect to the first display 701. Therefore, in the embodiment, after the input operation is collected by the collector 703, a sliding direction of the touch point in the input operation is monitored, to determine whether the user performs an operation in the direction of the second display 702 with respect to the first display 701 such as a single-finger sliding operation to the second display or a multi-finger sliding operation to the second display. Further, a result for indicating that the input operation meets the first condition is obtained. Then, the first display 701 is controlled to display the indicating content to indicate that the second display 702 outputs the second content in the first display content, so as to implement the object of the embodiment. Furthermore, the indicating content includes the indicating identifier indicating the direction of the second display with respect to the first display, such as a right arrow or a ball jumping downwards.

It should be noted that the embodiments of the present disclosure are described herein in a progressive manner, with the emphasis of each of the embodiments on the difference between it and the other embodiments; hence, for the same or similar parts between the embodiments, one can refer to the other embodiments.

In the end, it should be noted that terms "include", "comprise" or any other variations are intended to cover non-exclusive "include", so that a process, a method, an object or a device including a series of factors not only include the series of factors, but also include other factors not explicitly listed, or also include inherent factors of the process, the method, the object or the device. Without more limitation, a factor defined in a sentence "include one . . . " does not exclude a case that there is also another same factor in the process, the method, the object or the device including the described factor.

The control method and the electronic device provided in the present disclosure are introduced in detail above, a specific example is used in the present disclosure to describe the principle and the embodiments of the present disclosure, the embodiments described above are only used to assist in understanding the method and the core concept of the present disclosure; for those skilled in the art, changes can be made to the embodiments and the application range based on the concept of the present disclosure, in summary, the specification should not be understood to be limit the present disclosure.

The invention claimed is:

1. A control method, comprising:
   collecting input data by a hardware collector, in a case that a first content is displayed on a first display;
   determining whether the input data meets a first condition, to obtain a result; and
   controlling the first display to display an indicating content based on the result, wherein the indicating content is configured to indicate that a second display is in a first display state to output a second content and the indicating content comprises an icon showing a direction of the second display with respect to the first display,
   wherein the first display is different from the second display, and the first content is different from the indicating content.

2. The method according to claim 1, wherein before controlling the first display to display the indicating content, the method further comprises:
   generating a display control instruction based on the input data, wherein the first display state of the second display is triggered to output the second content in response to the display control instruction.

3. The method according to claim 2, wherein
   first power consumption of the second display in the first display state is higher than second power consumption of the second display in a second display state, and the second display is in the second display state before the display control instruction is generated.

4. The method according to claim 1, wherein after controlling the first display to display the indicating content, the method further comprises:
   controlling the first display to switch from a second display state to a third display state,
   wherein a first power consumption of the first display in the second display state is higher than a second power consumption of the first display in the third display state.

5. The method according to claim 1, wherein the first display has a different imaging method from the second display.

6. The method according to claim 5, wherein a first content is imaged on the first display is a real image with a first size, a second content is imaged on the second display as a virtual image with a second size;
   wherein the second size is larger than the first size.

7. The method according to claim 1, wherein the indicating content comprises direction information, the direction information matches with a position parameter of the second display with respect to the first display.

8. The method according to claim 1, the controlling the first display to display the indicating content comprises:
   selecting a target display from a plurality of second displays;
   determining a position parameter of the target display with respect to the first display;
   generating the indicating content based on the position parameter, wherein the indicating content comprises direction information matching with the position parameter of the target display with respect to the first display; and
   controlling the first display to display the indicating content.

9. An electronic device, comprising:
   a first display configured to display a first content;
   a second display different from the first display;
   a hardware collector configured to collect input data; and
   a processor configured to determine whether the input data collected by the hardware collector meets a first condition, to obtain a result, and control the first display to display an indicating content based on the result, wherein the indicating content is configured to indicate that the second display is in a first display state to output a second content, and the first content is different from the indicating content, and wherein the indicating content comprises an icon showing a direction of the second display with respect to the first display.

10. The electronic device according to claim 9, wherein the collector comprises a touch sensor, and the collector is overlapped with the first display in a lightning direction of the first display.

11. The electronic device according to claim 9, wherein the first display is provided at a first position, a second display is provided at a second position different from the first position, wherein a first viewing range of the first display is not overlapped with a second viewing range of the second display.

12. The electronic device according to claim 9, wherein an imaging displaying structure of the first display is different from an imaging displaying structure of the second display; and the first display has a different image method from the second display.

13. The electronic device according to claim 12, wherein the imaging displaying structure of the second display comprises:

a second display component configured to output initial light;

a light path conversion component configured to receive the initial light from the second display component, perform a light path conversion on the initial light to form a virtual image, and emit the initial light after the light path conversion from a second display area;

wherein a seize of the virtual image is larger than a size of the second display component.

14. The electronic device according to claim 13, wherein a display content of the first display is imaged as a real image, and a size of the real image is smaller than a size of the virtual image.

15. The electronic device according to claim 9, further comprising:

a body device and a maintaining device;

wherein the maintaining device has at least one maintaining mode, the maintaining device is at least a portion of annular space or at least a portion of an approximate-annular space meeting a first preset condition, and the annular space or the approximate-annular space fixes the body device on a periphery of a column meeting a second preset condition; and wherein the first display, the second display, the collector and the processor are arranged in the body device and/or the maintaining device.

* * * * *